United States Patent
Ojima et al.

(10) Patent No.: US 10,479,903 B2
(45) Date of Patent: Nov. 19, 2019

(54) UV-CURABLE INKJET INK COMPOSITION

(71) Applicant: SHOWA ALUMINUM CAN CORPORATION, Tokyo (JP)

(72) Inventors: Shinichi Ojima, Tokyo (JP); Kazunori Ikeda, Tokyo (JP); Asumi Suwa, Tokyo (JP)

(73) Assignee: SHOWA ALUMINUM CAN CORPORATION, Tokyo (JP)

( * ) Notice: Subject to any disclaimer, the term of this patent is extended or adjusted under 35 U.S.C. 154(b) by 0 days.

(21) Appl. No.: 16/062,986

(22) PCT Filed: Dec. 16, 2016

(86) PCT No.: PCT/JP2016/087586
§ 371 (c)(1),
(2) Date: Jun. 15, 2018

(87) PCT Pub. No.: WO2017/119265
PCT Pub. Date: Jul. 13, 2017

(65) Prior Publication Data
US 2018/0371271 A1 Dec. 27, 2018

(30) Foreign Application Priority Data

Jan. 7, 2016 (JP) .................. 2016-001757

(51) Int. Cl.
C08F 2/46 (2006.01)
C08F 2/50 (2006.01)
C08G 61/04 (2006.01)
C09D 11/101 (2014.01)
B41J 2/01 (2006.01)
B41M 5/00 (2006.01)
C09D 11/30 (2014.01)
B41M 1/28 (2006.01)
B41M 1/40 (2006.01)
C09D 11/322 (2014.01)
C09D 11/38 (2014.01)

(52) U.S. Cl.
CPC .............. C09D 11/101 (2013.01); B41J 2/01 (2013.01); B41M 1/28 (2013.01); B41M 1/40 (2013.01); B41M 5/00 (2013.01); C09D 11/30 (2013.01); C09D 11/322 (2013.01); C09D 11/38 (2013.01)

(58) Field of Classification Search
CPC ..... C09D 11/101; C09D 11/38; C09D 11/322; B41M 1/40; B41M 1/28
USPC ................................. 522/1; 520/1
See application file for complete search history.

(56) References Cited

U.S. PATENT DOCUMENTS

| | | |
|---|---|---|
| 2013/0010039 A1 | 1/2013 | Kida et al. |
| 2013/0196126 A1 | 8/2013 | Toyoda et al. |
| 2015/0010722 A1 | 1/2015 | Yamada et al. |
| 2015/0015648 A1* | 1/2015 | Ikeda ................... C09D 11/101 347/102 |
| 2015/0315396 A1 | 11/2015 | Kida et al. |
| 2017/0008325 A1* | 1/2017 | Hiraoka ............... C09D 167/00 |
| 2018/0022946 A1 | 1/2018 | Kida et al. |

FOREIGN PATENT DOCUMENTS

| | | | |
|---|---|---|---|
| CN | 101698698 A | 4/2010 | |
| CN | 101993629 A | 3/2011 | |
| CN | 102417760 * | 4/2012 | |
| CN | 102863847 A | 1/2013 | |
| CN | 103242702 A | 8/2013 | |
| CN | 108148468 A | 6/2018 | |
| CN | 108373657 A | 8/2018 | |
| EP | 2 543 707 A1 | 1/2013 | |
| EP | 2 623 570 A1 | 8/2013 | |
| EP | 3 255 110 A1 | 12/2017 | |
| JP | 11-148037 A | 6/1999 | |
| JP | 2004-042464 A | 2/2004 | |
| JP | 2009-249435 A | 10/2009 | |
| JP | 2013-036020 A | 2/2013 | |
| JP | 2013-60548 A | 4/2013 | |
| JP | 2013-159645 A | 8/2013 | |
| JP | 2013-169975 A | 9/2013 | |
| JP | 2013-177571 A | 9/2013 | |
| JP | 2016-121361 A | 7/2016 | |
| JP | 3207784 * | 12/2016 | ........... B29C 45/263 |
| JP | 3207784 U | 12/2016 | |
| JP | 2018-119158 A | 8/2018 | |
| WO | WO-2013094198 A1 * | 6/2013 | ........... C09D 11/101 |

OTHER PUBLICATIONS

Shoude et al, CN 102417760 Machine Translation, Apr. 8, 2012 (Year: 2012).*
Ikeda et al, JP-3207784 Machine Translation, Dec. 1, 2016 (Year: 2016).*
International Search Report of PCT/JP2016/087586 dated Feb. 21, 2017.
Communication dated Jul. 9, 2019, from the European Patent Office in counterpart European Application No. 16883765.6.

* cited by examiner

Primary Examiner — Jessica Whiteley
(74) Attorney, Agent, or Firm — Sughrue Mion, PLLC

(57) ABSTRACT

A UV-curable inkjet ink composition is curable by irradiation with ultraviolet light and includes a monofunctional monomer (A), a polyfunctional monomer (B), a photopolymerization initiator (C), and a colorant (D), wherein the composition has a hydroxyl value within the range of not less than 1 mgKOH/g and not more than 100 mgKOH/g, and is for forming, by inkjet printing, an ink layer 14 provided between a curved outer peripheral surface of a cylindrical can base 12 made of a metal material, and a coating layer 16 made of an aqueous coating material.

14 Claims, 1 Drawing Sheet

UV-CURABLE INKJET INK COMPOSITION

CROSS REFERENCE TO RELATED APPLICATIONS

This application is a National Stage of International Application No. PCT/JP2016/087586 filed Dec. 16, 2016, claiming priority based on Japanese Patent Application No. 2016-001757 filed Jan. 7, 2016.

TECHNICAL FIELD

The present invention relates to a UV-curable inkjet ink composition.

BACKGROUND ART

There is a technique to form an image onto an outer peripheral surface of a can body made of a metal material in a cylindrical shape by inkjet printing.

In Patent Document 1, there is disclosed a technique to form an image onto an outer peripheral surface of a can body by ejecting ink by an inkjet head.

CITATION LIST

Patent Literature

Patent Document 1: Japanese Patent Application Laid-Open Publication No. 2013-169975

SUMMARY OF INVENTION

Technical Problem

By the way, when an ink layer is formed, by inkjet printing, onto a can body by use of a UV-curable inkjet ink composition cured by irradiation with ultraviolet light, a covering layer made of an aqueous coating material is formed on the ink layer for the purpose of protecting the ink layer in some cases.

An object of the present invention is to provide a UV-curable inkjet ink composition capable of realizing an ink layer excellent in adhesive property with a covering layer made of an aqueous coating material onto an outer peripheral surface having a curvature.

Solution to Problem

A UV-curable inkjet ink composition according to the present invention contains a monofunctional monomer (A), a polyfunctional monomer (B), a photopolymerization initiator (C) and a colorant (D) and is cured by irradiation with ultraviolet light, wherein a hydroxyl value of the UV-curable inkjet ink composition is in a range of not less than 1 mgKOH/g and not more than 100 mgKOH/g, and the UV-curable inkjet ink composition forms, by inkjet printing, an ink layer provided between a curved outer peripheral surface of a can base made of a cylindrical metallic material and a covering layer made of an aqueous coating material.

Here, at least one of the monofunctional monomer (A) and the polyfunctional monomer (B) includes a hydroxyl-containing monomer.

Moreover, a blending amount ratio of the photopolymerization initiator (C) and the colorant (D) satisfies $0.5 \leq$ (photopolymerization initiator/colorant)$\leq 5.0$.

Further, the photopolymerization initiator (C) contains an acylphosphine-oxide-based photopolymerization initiator.

Still further, a blending amount ratio of the monofunctional monomer (A) and the polyfunctional monomer (B) satisfies $2 \leq$ (monofunctional monomer (A)/polyfunctional monomer (B))$\leq 20$.

Moreover, an average number of functional groups of a polymerizable compound containing the monofunctional monomer (A) and the polyfunctional monomer (B) is in a range of not less than 1.0 and not more than 1.4.

Still further, the monofunctional monomer (A) contains a monofunctional monomer having a glass transition temperature of less than 20° C., and a content rate of the monofunctional monomer having the glass transition temperature of less than 20° C. in the monofunctional monomer (A) is in a range of not less than 50% by mass and not more than 100% by mass.

Advantageous Effects of Invention

According to the present invention, a UV-curable inkjet ink composition is capable of realizing an ink layer excellent in adhesive property with a covering layer made of an aqueous coating material onto an outer peripheral surface having a curvature.

DESCRIPTION OF EMBODIMENTS

Figure 1A:
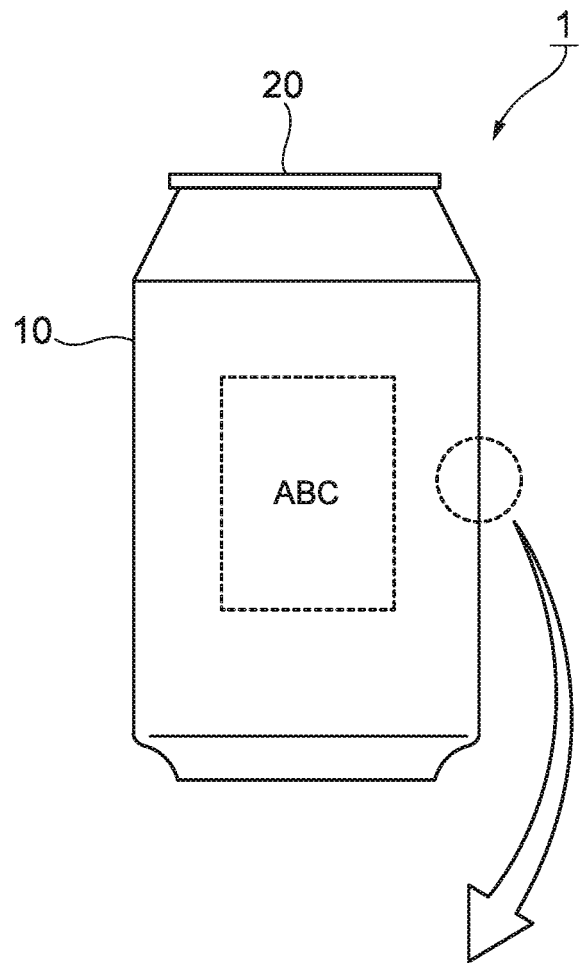
FIGS. 1A and 1B are diagrams showing a can body subjected to printing by a UV-curable inkjet ink composition to which the exemplary embodiment is applied.
Figure 1B:
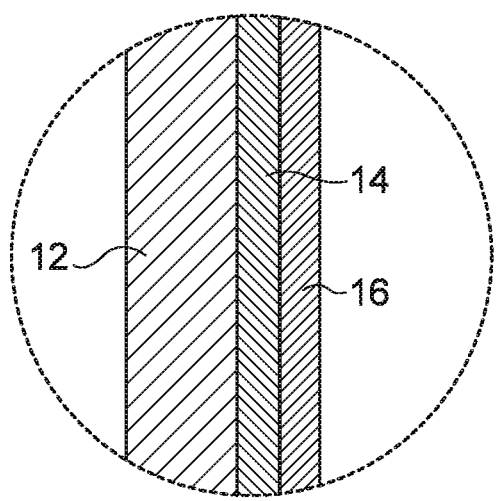

Hereinafter, the exemplary embodiment according to the present invention will be described in detail with reference to attached drawings. FIGS. 1A and 1B are diagrams showing a can body 1 subjected to printing by a UV-curable inkjet ink composition to which the exemplary embodiment is applied. FIG. 1A is a diagram showing an outline of the can body 1 and FIG. 1B is a diagram enlarging a part of a cross section of FIG. 1A.

As shown in FIGS. 1A and 1B, the can body 1 includes a container portion 10 in a closed-end cylindrical shape and a lid member 20 that closes an opening formed at an upper portion of the container portion 10. The container portion 10 and the lid member 20 are composed of, for example, a metal material, such as aluminum.

The container portion 10 includes: a can base 12 that is fillable with contents; an ink layer 14 that is laminated on a curved outer peripheral surface, which is an outer peripheral surface of the can base 12 having a curvature, the ink layer 14 being formed by inkjet printing with a UV-curable inkjet ink composition to be described later; and a covering layer 16 that is laminated on the ink layer 14 to cover the surface of the ink layer 14. Note that, between the outer peripheral surface of the can base 12 and the ink layer 14, an undercoating layer may be provided for the purpose of, for example, improving the adhesive property of the can base 12 and the ink layer 14, or the like.

The ink layer 14 of the exemplary embodiment is formed by ejecting the UV-curable inkjet ink composition, which is cured by irradiation with ultraviolet light, onto the can base 12 by an inkjet printer, and thereafter, irradiating thereof with ultraviolet light. In the exemplary embodiment, the UV-curable inkjet ink composition is used for forming the ink layer 14, and therefore, it becomes possible to cure the ink composition in a short time, as compared to, for example, a case of using a solvent or aqueous ink composition. Moreover, it becomes possible to reduce the use of organic solvents in ink compositions, to thereby reduce environmental impact.

Note that the UV-curable inkjet ink composition to form the ink layer 14 will be described in detail later.

Moreover, the covering layer 16 of the exemplary embodiment is provided for the purpose of protecting the ink layer 14, imparting a luster to the surface of the ink layer 14, or the like. Moreover, by providing the covering layer 16, it is possible to prevent unreacted photopolymerization initiator, monomer or the like remaining in the ink layer 14 obtained by curing the UV-curable inkjet ink composition from directly contacting a human body.

The covering layer 16 of the exemplary embodiment is formed by applying an aqueous coating material onto the ink layer 14 and drying thereof. Note that the aqueous coating material to form the covering layer 16 will be described in detail later.

The can base 12 has, in the exemplary embodiment, for example, a closed-end cylindrical shape in which the upper portion in the FIGURE opens to be filled with the contents. The contents are not particularly limited, but may be, for example, beverages represented by alcohols, such as beer and soft drinks, such as juice. Moreover, the can base 12 is not particularly limited as long as being fillable with the contents; for example, it is possible to use metals, such as an aluminum can, a steel can, or a tin can. Note that, as the can base 12, the one in a tubular shape may be used as long as the one is made of metals, such as aluminum, steel or tin, has a cylindrical shape.

<UV-Curable Inkjet Ink Composition>

Subsequently, the UV-curable inkjet ink composition to which the exemplary embodiment is applied will be described.

An ink composition used to form the ink layer 14 in the exemplary embodiment is the UV-curable inkjet ink composition cured by irradiation with the ultraviolet light. Note that, in the following description, the UV-curable inkjet ink composition will be simply referred to as ink composition in some cases.

The ink composition of the exemplary embodiment includes, as polymerizable compounds, a monofunctional monomer (A) and a polyfunctional monomer (B). Further, the UV-curable inkjet ink composition of the exemplary embodiment includes a photopolymerization initiator (C) and a colorant (D).

Moreover, the ink composition of the exemplary embodiment has a hydroxyl value in the range of not less than 1 mgKOH/g and not more than 100 mgKOH/g.

[Hydroxyl Value of Ink Composition]

In the exemplary embodiment, the hydroxyl value of the ink composition means an amount (mg) of potassium hydroxide required for acetylating a hydroxyl group contained per g of the ink composition by acetic anhydride and neutralizing acetic acid generated by acetylation.

The hydroxyl value of the ink composition can be obtained by calculation according to the method prescribed in JIS K 0070. Moreover, a theoretical value of the hydroxyl value of the ink composition can be obtained by calculation based on a blended composition of a hydroxyl-containing compound (hydroxyl-containing monomer) per g of the ink composition.

As a method for obtaining the hydroxyl value from the blended composition of the hydroxyl-containing compound per g of the ink composition, specifically, the following expression (1) can be provided.

$$\text{Hydroxyl value [mgKOH/g]} = (M_A \times \alpha_A + M_B \times \alpha_B + \ldots) \times 56000 \quad (1)$$

Here, in the expression (1), $M_X$ represents the amount of substance of the hydroxyl-containing compound (X) per g of the ink composition and $\alpha_X$ represents the number of hydroxyl groups contained per molecule of the hydroxyl-containing compound (X).

As described above, the hydroxyl value of the ink composition in the exemplary embodiment is in the range of not less than 1 mgKOH/g and not more than 100 mgKOH/g, preferably in the range of not less than 1 mgKOH/g and not more than 60 mgKOH/g, and more preferably in the range of not less than 5 mgKOH/g and not more than 30 mgKOH/g.

When the hydroxyl value of the ink composition is less than 1 mgKOH/g, there is a possibility that the adhesive property of the ink layer 14 to the can base 12 becomes insufficient. Moreover, when the hydroxyl value of the ink composition is less than 1 mgKOH/g, there is a possibility that, when a coating material for forming the covering layer 16 is applied to the ink layer 14 after the ink layer 14 is formed on the can base 12, the coating material is rejected, or the adhesive property of the ink layer 14 to the covering layer 16 becomes insufficient.

On the other hand, when the hydroxyl value of the ink composition is more than 100 mgKOH/g, there is a possibility that the water resistance of the ink layer 14 is degraded.

Here, in general, the UV-curable ink composition has a large volume shrinkage ratio when being cured, as compared to the solvent or aqueous ink composition. Therefore, depending on the property of the UV-curable ink composition, there is a possibility that the adhesive property to the can base 12 becomes insufficient. In particular, the can base 12 has a cylindrical shape and the outer peripheral surface thereof, on which the ink layer 14 is formed, has a curvature. Consequently, effects by volume shrinkage of the ink composition are apt to be increased as compared to a case in which the surface on which the ink layer 14 is formed is a flat surface.

In contrast thereto, in the exemplary embodiment, by setting the hydroxyl value of the ink composition in the range of not less than 1 mgKOH/g and not more than 100 mgKOH/g, it becomes possible to improve the adhesive property of the ink layer 14 with respect to the outer peripheral surface of the can base 12 having a curvature.

Further, in the exemplary embodiment, by setting the hydroxyl value of the ink composition in the range of not less than 1 mgKOH/g and not more than 100 mgKOH/g, it becomes possible to improve wettability of the aqueous coating material with respect to the ink layer 14 as compared to a case in which the hydroxyl value falls out of the range. Consequently, rejection of the coating material when the aqueous coating material is applied to the ink layer 14 is suppressed, and it becomes possible to improve the adhesive property between the ink layer 14 and the covering layer 16.

[Polymerizable Compound]

As described above, the ink composition of the exemplary embodiment includes, as polymerizable compounds, the monofunctional monomer (A) and the polyfunctional monomer (B). Here, the polymerizable compound means a compound containing a radically polymerizable functional group that shows reactivity when being irradiated with ultraviolet light. Though details will be described later, other than the monofunctional monomer (A) and the polyfunctional monomer (B), the ink composition of the exemplary embodiment may include, as polymerizable compounds, an acrylate oligomer. Note that, in the description of the exemplary embodiment, there are some cases in which the radically polymerizable functional group showing reactivity when being irradiated with ultraviolet light is simply referred to as a functional group.

In the ink composition of the exemplary embodiment, it is preferable that the content of the polymerizable compound in the total mass of the ink composition is in the range of not less than 20% by mass and not more than 95% by mass.

(Monofunctional Monomer)

As described above, the ink composition of the exemplary embodiment includes, as the polymerizable compound, the monofunctional monomer (A).

Here, the monofunctional monomer (A) is a monomer with the number of functional groups of 1.

In the ink composition of the exemplary embodiment, from a standpoint of the viscosity adjustment of the ink composition, the curing property or the strength of the ink layer 14 or others, the content of the monofunctional monomer (A) in the total mass of the ink composition is preferably in the range of not less than 40% by mass and not more than 80% by mass, and more preferably, in the range of not less than 50% by mass and not more than 70% by mass.

When the content of the monofunctional monomer (A) is less than 40% by mass in the ink composition, it becomes difficult to adjust the viscosity of the ink composition to fall within the desired range. On the other hand, when the content of the monofunctional monomer (A) in the ink composition exceeds 80% by mass, there is a possibility that the curing property or the strength of the ink layer 14 becomes insufficient.

Specific examples of the monofunctional monomer (A) used for the ink composition of the exemplary embodiment include: stearyl acrylate; acryloyl morpholine; tridecyl acrylate; lauryl acrylate; N, N-dimethylacrylamide; decyl acrylate; phenoxyethyl acrylate; isodecyl acrylate; isobornyl acrylate; dicyclopentanyl acrylate; dicyclopentenyl acrylate; isooctyl acrylate; octyl acrylate; dicyclopentenyl oxyethyl acrylate; cyclohexyl acrylate; N-vinylcaprolactam; isoamyl acrylate; EO (ethylene oxide)-modified 2-ethylhexyl acrylate; neopentyl glycol acrylate benzoate; N-vinyl-2-pyrrolidone; N-vinylimidazole; tetrahydrofurfuryl acrylate; methoxy dipropylene glycol acrylate; (2-methyl-2-ethyl-1, 3-dioxolane-4-yl) methyl acrylate; cyclic trimethylolpropane formal acrylate; ethoxy-diethyleneglycol acrylate; 2-(2'-vinyloxyethoxy) ethyl acrylate; 2-hydroxyethoxyethyl acrylate; 2-hydroxybutyl acrylate; 2-hydroxypropyl acrylate; 2-hydroxyethyl acrylate; 4-hydroxybutyl acrylate; hydroxy (caprolactone-modified) 2-ethyl acrylate; 2-hydroxy-3-phenoxypropyl acrylate; 2-ethylhexyl-diglycol acrylate; 2-acryloyloxy ethyl hexahydro phthalate; 2-acryloyloxy ethyl phthalate; 2-acryloyloxy ethyl-2-hydroxyethyl phthalate; polypropylene glycol monoacrylate; and 1,4-cyclohexane dimethanol monoacrylate. Of these, lauryl acrylate, phenoxyethyl acrylate, isobornyl acrylate, methoxy dipropylene glycol acrylate, cyclic trimethylolpropane formal acrylate, ethoxy-diethyleneglycol acrylate, 2-hydroxybutyl acrylate, 2-hydroxypropyl acrylate, 2-hydroxyethyl acrylate, 4-hydroxybutyl acrylate, hydroxy (caprolactone-modified) 2-ethyl acrylate, 2-hydroxy-3-phenoxypropyl acrylate, and 2-(2'-vinyloxyethoxy) ethyl acrylate are preferred. Note that, one of these monofunctional monomers (A) may be solely used, or two or more of them may be used in combination.

In the ink composition of the exemplary embodiment, from a standpoint of imparting flexibility to the ink layer 14, it is preferable that the monofunctional monomer (A) contains a monofunctional monomer having a glass transition temperature of less than 20° C. (Tg<20° C.).

Moreover, it is preferable that the content of the monofunctional monomer having the glass transition temperature of less than 20° C. is, in the total mass of the monofunctional monomer (A), in the range of not less than 50% by mass and not more than 100% by mass. When, in the total mass of the monofunctional monomer (A), the content of the monofunctional monomer having the glass transition temperature of less than 20° C. is less than 50% by mass, there is a possibility that the adhesive property between the ink layer 14 and the covering layer 16 is degraded.

Specific examples of the monofunctional monomer having the glass transition temperature of less than 20° C. include: stearyl acrylate; tridecyl acrylate; lauryl acrylate; phenoxyethyl acrylate; isodecyl acrylate; cyclohexyl acrylate; tetrahydrofurfuryl acrylate; methoxy dipropylene glycol acrylate; ethoxy-diethyleneglycol acrylate; 2-hydroxyethoxyethyl acrylate; 2-hydroxybutyl acrylate; 2-hydroxypropyl acrylate; 2-hydroxyethyl acrylate; 4-hydroxybutyl acrylate; and hydroxy (caprolactone-modified) 2-ethyl acrylate. Of these, phenoxyethyl acrylate, tetrahydrofurfuryl acrylate, methoxy dipropylene glycol acrylate, ethoxy-diethyleneglycol acrylate, 4-hydroxybutyl acrylate, and hydroxy (caprolactone-modified) 2-ethyl acrylate are preferred. Note that, one of these monofunctional monomers having the glass transition temperature of less than 20° C. may be solely used, or two or more of them may be used in combination.

(Polyfunctional Monomer)

As described above, the ink composition of the exemplary embodiment includes, as the polymerizable compound, the polyfunctional monomer (B). Here, the polyfunctional monomer (B) is a monomer with the number of functional groups of 2 or more.

In the ink composition of the exemplary embodiment, from a standpoint of the strength of the ink layer 14 or the volume shrinkage when curing the ink composition or others, the content of the polyfunctional monomer (B) in the total mass of the ink composition is preferably in the range of not less than 5% by mass and not more than 50% by mass.

When the content of the polyfunctional monomer (B) in the ink composition is less than 5% by mass, there is a possibility that the strength of the ink layer 14 becomes insufficient. On the other hand, when the content of the polyfunctional monomer (B) in the ink composition exceeds 50% by mass, there is a possibility that the volume shrinkage ratio when curing the ink composition is increased, to thereby degrade the adhesive property to the can base 12 or the covering layer 16.

Specific examples of the polyfunctional monomers (B) used for the ink composition of the exemplary embodiment include: 1,10-decanediol diacrylate; 2-methyl-1,8-octanediol diacrylate; 2-butyl-2-ethyl-1,3-propanediol diacrylate; 1,9-nonanediol diacrylate; 1,7-heptanediol diacrylate; 1,6-hexanediol diacrylate; 1,4-butanediol diacrylate; polytetramethylene glycol diacrylate; 3-methyl-1,5-pentanediol diacrylate; neopentyl glycol diacrylate; hydroxypivalate neopentyl glycol diacrylate; tetraethylene glycol diacrylate; tetrapropylene glycol diacrylate; triethylene glycol diacrylate; tripropylene glycol diacrylate; diethylene glycol diacrylate; dipropylene glycol diacrylate; trimethylolpropane triacrylate; ethoxylated trimethylolpropane triacrylate; propoxylated trimethylolpropane triacrylate; ethoxylated glycerin triacrylate; pentaerythritol triacrylate; pentaerythritol tetraacrylate; ethoxylated pentaerythritol tetraacrylate; ethoxylated diglycerol tetraacrylate; ditrimethylolpropane tetraacrylate; dipentaerythritol pentaacrylate; dipentaerythritol hexaacrylate; and 2-hydroxy-3-acryloyloxypropyl methacrylate. Of these, 1,6-hexanediol diacrylate, 1,9-nonanediol diacrylate, triethylene glycol diacrylate, tetraethylene glycol diacrylate, dipropylene glycol diacrylate, tripropylene glycol diacrylate, dipentaerythritol hexaacrylate, trimethylolpropane triacrylate, and pentaerythritol triacrylate are preferred. Note that, one of these polyfunctional monomers (B) may be solely used, or two or more of them may be used in combination.

In the ink composition of the exemplary embodiment, from a standpoint of imparting the hydroxyl value, it is preferable that at least one of the monofunctional monomer (A) and the polyfunctional monomer (B) includes hydroxyl-containing monomer. Specifically, it is preferable that at least one of the monofunctional monomer (A) and the polyfunctional monomer (B) includes a compound expressed in:

[$R_1$ denotes hydrogen or a methyl group, $R_2$ denotes an alkylene group with 2 to 6 carbons, and n is an integer from 1 to 4],
and/or a compound expressed in:

[$R_1$ denotes hydrogen or a methyl group, and n is an integer from 1 to 3].
Note that, one of these hydroxyl-containing monomers may be solely used, or two or more of them may be used in combination.

In the ink composition of the exemplary embodiment, from the standpoint of adhesive property and flexibility of the ink layer 14, it is preferable that a blending amount ratio of the monofunctional monomer (A) and the polyfunctional monomer (B) (monofunctional monomer (A)/polyfunctional monomer (B)) satisfies the relationship 2≤(monofunctional monomer (A)/polyfunctional monomer (B))≤20.

When the blending amount ratio of the monofunctional monomer (A) and the polyfunctional monomer (B) is less than 2, there is a tendency that a crosslink density of the ink layer 14 is increased and the adhesive property of the ink layer 14 is degraded. On the other hand, when the blending amount ratio of the monofunctional monomer (A) and the polyfunctional monomer (B) exceeds 20, there is a possibility that the strength of the ink layer 14 becomes insufficient.
(Acrylate Oligomer)

From the standpoint of improving strength of the ink layer 14, the ink composition of the exemplary embodiment may include acrylate oligomer as the polymerizable compound. Here, the acrylate oligomer is an oligomer containing one or more acryloyloxy groups and preferably has 2 to 6 functional groups.

When the ink composition includes the acrylate oligomer as the polymerizable compound, the content of the acrylate oligomer is, for example, in the total mass of the polymerizable compound, in the range of not less than 1% by mass and not more than 10% by mass.

Specific examples of acrylate oligomer include: amino acrylate oligomer; urethane acrylate oligomer; epoxy acrylate oligomer; silicone acrylate oligomer; ester acrylate oligomer; and butadiene acrylate oligomer, but there is no particular limitation.

In the ink composition of the exemplary embodiment, it is preferable that an average number of functional groups of the above-described polymerizable compound is in the range of not less than 1.0 and not more than 1.4. Here, the average number of functional groups of the polymerizable compound can be obtained by calculating (the total number of functional groups of the polymerizable compound in the ink composition/the total quantity of the polymerizable compound in the ink composition), and represents the number of functional groups per molecule of the polymerizable compound.

When the average number of functional groups of the polymerizable compound exceeds 1.4 in the ink composition, since the crosslink density of the ink layer 14 is increased, there is a possibility that the adhesive property of the ink layer 14 is degraded.
[Photopolymerization Initiator]

As the photopolymerization initiator (C) used for the ink composition of the exemplary embodiment, for example, an α-aminoketone-based compound, a benzophenone-based compound, an acetophenone-based compound, a thioxanthone-based compound, an acylphosphine-oxide-based compound, and others can be provided. Of these, from the standpoint of the curing property of the ink composition, it is preferable that a photopolymerization initiator (C) with an absorption wavelength that overlaps as much as possible the wavelength of ultraviolet light with which the ink composition is irradiated when being cured. For example, when ultraviolet light with the main wavelength of 360 nm to 425 nm is used, it is preferable to use the acylphosphine-oxide-based compound as the photopolymerization initiator (C).

Specific examples of the photopolymerization initiator (C) include:
2,2-dimethoxy-1,2-diphenylethane-1-one; 1-hydroxy-cyclohexyl-phenyl-ketone; 2-hydroxy-2-methyl-1-phenylpropane-1-one; benzophenone; 1-[4-(2-hydroxyethoxy)-phenyl]-2-hydroxy-2-methyl-1-propane-1-one; 2-hydroxy-1-{4-[4-(2-hydroxy-2-methyl propionyl)-benzyl]-phenyl}-2-methyl-propane-1-one; phenyl glyoxylic acid methyl ester; 2-methyl-1-[4-(methylthio)phenyl]-2-morpholino-propane-1-one; 2-benzyl-2-dimethylamino-1-(4-morpholinophenyl)-butanone; 2-dimethylamino-2-(4-methylbenzyl)-1-(4-morpholine-4-yl-phenyl)-butane-1-one; bis(2,4,6-trimethylbenzoyl)-phenylphosphine oxide; bis(2,6-dimethoxybenzoyl)-2,4,4-trimethyl-pentylphosphine oxide; 2,4,6-trimethylbenzoyl-diphenyl-phosphine oxide; 1,2-octanedione; 1-[4-(phenylthio)-2-(O-benzoyl oxime)]; 2,4-diethyl thioxanthone; 2-isopropyl thioxanthone; and 2-chlorothioxanthone. Of these, from the standpoint of the curing property of the ink composition, 2,4,6-trimethylbenzoyl-diphenyl-phosphine oxide and bis (2,4,6-trimethylbenzoyl)-phenylphosphine oxide are preferred. Note that, one of these photopolymerization initiators (C) may be solely used, or two or more of them may be used in combination.
[Colorant]

As the colorant (D) used for the ink composition of the exemplary embodiment, for example, dyes, pigments or others can be provided; however, from a standpoint of weather resistance of the ink layer 14, it is preferable to use the pigments.

In the ink composition, the content of the colorant (D) can be, for example, in the total mass of the ink composition, in the range of not less than 1% by mass and not more than 10% by mass. Note that, one of the colorants (D) may be solely used, or two or more of them may be used in combination.

Specific examples of the colorant (D) include:

C. I. Pigment Yellow 1, 2, 3, 4, 5, 6, 7, 9, 10, 12, 13, 14, 15, 16, 17, 24, 32, 34, 35, 36, 37, 41, 42, 43, 49, 53, 55, 60, 61, 62, 63, 65, 73, 74, 75, 77, 81, 83, 87, 93, 94, 95, 97, 98, 99, 100, 101, 104, 105, 106, 108, 109, 110, 111, 113, 114, 116, 117, 119, 120, 123, 124, 126, 127, 128, 129, 130, 133, 138, 139, 150, 151, 152, 153, 154, 155, 165, 167, 168, 169, 170, 172, 173, 174, 175, 176, 179, 180, 181, 182, 183, 184, 185, 191, 193, 194, 199, 205, 206, 209, 212, 213, 214, 215, 219, C. I. Pigment Orange 1, 2, 3, 4, 5, 13, 15, 16, 17, 19, 20, 21, 24, 31, 34, 36, 38, 40, 43, 46, 48, 49, 51, 60, 61, 62, 64, 65, 66, 67, 68, 69, 71, 72, 73, 74, 81, C. I. Pigment Red 1, 2, 3, 4, 5, 6, 7, 8, 9, 10, 11, 12, 14, 15, 16, 17, 18, 21, 22, 23, 31, 32, 38, 41, 48, 48:1, 48:2, 48:3, 48:4, 48:5, 49, 52, 52:1, 52:2, 53:1, 54, 57:1, 58, 60:1, 63, 64:1, 68, 81:1, 83, 88, 89, 95, 101, 104, 105, 108, 112, 114, 119, 122, 123, 136, 144, 146, 147, 149, 150, 164, 166, 168, 169, 170, 171, 172, 175, 176, 177, 178, 179, 180, 181, 182, 183, 184, 185, 187, 188, 190, 193, 194, 200, 202, 206, 207, 208, 209, 210, 211, 213, 214, 216, 220, 221, 224, 226, 237, 238, 239, 242, 245, 247, 248, 251, 253, 254, 255, 256, 257, 258, 260, 262, 263, 264, 266, 268, 269, 270, 271, 272, 279, 282, C. I. Pigment Violet 1, 2, 3, 3:1, 3:3, 5:1, 13, 15, 16, 17, 19, 23, 25, 27, 29, 31, 32, 36, 37, 38, 42, 50, C. I. Pigment Blue 1, 15, 15:1, 15:2, 15:3, 15:4, 15:5, 15:6, 16, 17:1, 24, 24:1, 25, 26, 27, 28, 29, 36, 56, 60, 61, 62, 63, 75, 79, 80, C. I. Pigment Green 1, 4, 7, 8, 10, 15, 17, 26, 36, 50, C. I. Pigment Brown 5, 6, 23, 24, 25, 32, 41, 42, C. I. Pigment Black 1, 6, 7, 9, 10, 11, 20, 31, 32, 34, C. I. Pigment White 1, 2, 4, 5, 6, 7, 11, 12, 18, 19, 21, 22, 23, 26, 27, 28, aluminum flakes, glass flakes and hollow particles.

Of these, from the standpoint of weather resistance or color reproducibility in the ink layer 14, it is preferable to use, as the colorant (D), C. I. Pigment Black 7,
C. I. Pigment Blue 15:3, 15:4, 28,
C. I. Pigment Red 101, 122, 202, 254, 282,
C. I. Pigment Violet 19,
C. I. Pigment White 6,
and C. I. Pigment Yellow 42, 120, 138, 139, 150, 151, 155, 180, 213.

Moreover, when the pigments are used as the colorant (D), from the standpoint of ejection stability of the ink composition in inkjet heads, it is preferable that a volume average particle diameter of pigment particles existing in the ink composition is in the range of not less than 0.05 μm and not more than 0.4 μm, and a volume maximum particle diameter thereof is in the range of not less than 0.2 μm and not more than 1 μm. When the volume average particle diameter of the pigment particles is more than 0.4 μm or the volume maximum particle diameter thereof is more than 1 μm, there is a tendency that it becomes difficult to stably eject the ink composition. Note that the volume average particle diameter and the volume maximum particle diameter of the pigment particles can be measured by a measuring tool using a dynamic light scattering method.

In the ink composition of the exemplary embodiment, it is preferable that a blending amount ratio of the photopolymerization initiator (C) and the colorant (D) in the total mass of the ink composition satisfies the relationship 0.5≤ (photopolymerization initiator/colorant)≤5.0. When the blending amount ratio of the photopolymerization initiator (C) and the colorant (D) in the total mass of the ink composition is less than 0.5, ultraviolet light is easily absorbed by the pigment, and accordingly, the sufficient curing property of the ink composition cannot be obtained in some cases. On the other hand, when the blending amount ratio of the photopolymerization initiator (C) and the colorant (D) in the total mass of the ink composition exceeds 5.0, since the number of radicals generated by ultraviolet light irradiation becomes excessive, molecular weight of reaction products is reduced, and thereby the strength of the ink layer 14 is degraded in some cases.

[Other Additives]

For the ink composition of the exemplary embodiment, as other components, additives, such as a light stabilizer, a polymerization inhibitor, a dispersant, an antioxidant, a surface conditioner, an adhesion imparting agent, a plasticizer, an anticorrosive agent, a solvent, a non-reactive polymer, a filler, a pH regulator, an antifoaming agent, a charge control agent, a stress relaxation agent, a penetrant, a light guiding material, a radiant material, a magnetic material and a phosphor, may be used as necessary.

[Properties of Ink Composition]

In the ink composition of the exemplary embodiment, the viscosity at 40° C. is preferably in the range of not less than 5 mPa·s and not more than 30 mPa·s, and more preferably in the range of not less than 5 mPa·s and not more than 20 mPa·s. By setting the viscosity of the ink composition at 40° C. in such a range, it is possible to realize good ejection stability when the ink composition is ejected by the inkjet heads. Note that the viscosity of the ink composition can be measured by use of a cone-plate viscometer.

Moreover, in the ink composition of the exemplary embodiment, it is preferable that the surface tension at 25° C. is in the range of not less than 22 mN/m and not more than 36 mN/m. By setting the surface tension of the ink composition at 25° C. in such a range, it is possible to realize good ejection stability when the ink composition is ejected by the inkjet heads. Note that the surface tension of the ink composition can be measured by a platinum plate method.

To prepare the ink composition of the exemplary embodiment, the monofunctional monomer (A), the polyfunctional monomer (B), the photopolymerization initiator (C), the colorant (D) and various kinds of components appropriately selected as needed are mixed. Thereafter, as needed, the obtained mixture is percolated by use of a filter having pore diameters not more than about 1/10 of nozzle diameters of the inkjet print head used for forming the ink layer 14. Consequently, the ink composition of the exemplary embodiment can be obtained.

Note that, in the exemplary embodiment, by adjusting the blending ratio of the monofunctional monomer (A), the polyfunctional monomer (B) and the photopolymerization initiator (C) in the ink composition, it is possible to set the viscosity and the surface tension of the ink composition in the desired range.

<Aqueous Coating Material>

Subsequently, description will be given of the aqueous coating material that is applied onto the ink layer 14 formed by the UV-curable inkjet ink composition to form the covering layer 16.

In the exemplary embodiment, from a standpoint of suppressing environmental impacts, an aqueous coating material is used for forming the covering layer 16. Here, the aqueous coating material refers to a coating material using water as a solvent.

As the aqueous coating material used in the exemplary embodiment, a normal-temperature dry-type aqueous coating material, a bake-hardenable aqueous coating material, a UV-curable aqueous coating material or others can be provided. Of these, from a standpoint of stability, safety or productivity of the coating material, it is preferable to use the bake-hardenable aqueous coating material.

As the bake-hardenable aqueous coating material used for forming the covering layer 16, coating materials of an alkyd resin base, an acrylate resin base, a vinyl resin base, a polyester resin base, an amino resin base, a polyurethane resin base, an epoxy resin base or the like can be provided. Of these, from a standpoint of coating film hardness and water resistance, it is preferable to use the coating material of amino resin base.

<Method of Forming Ink Layer and Covering Layer onto can Base>

Subsequently, description will be given of a method of forming the ink layer 14 and the covering layer 16 onto the can base 12 to obtain the can body 1.

In the exemplary embodiment, the ink layer 14 is formed onto the can base 12 of the can body 1 by inkjet printing by use of an inkjet printer. Since the inkjet printing does not need plates to form the ink layer 14, costs can be reduced as compared to a case in which the ink layer 14 is formed by offset printing. Moreover, as compared to the case in which the ink layer 14 is formed by offset printing, design of the ink layer 14 can be changed within a short period of time.

Hereinafter, the method of forming the ink layer 14 and the covering layer 16 onto the can base 12 will be specifically described.

In the exemplary embodiment, first, an undercoating layer is formed, as needed, on the outer peripheral surface of the can base 12 made of a metal material in a cylindrical shape. As the coating material used for forming the undercoating layer, for example, aqueous, solvent, or UV-curable coating materials can be used without any particular limitation.

Subsequently, the above-described UV-curable inkjet ink composition is ejected by use of inkjet heads of the inkjet printer onto the undercoating layer formed on the outer peripheral surface of the can base 12 or directly onto the outer peripheral surface of the can base 12, to thereby perform printing of an image or the like. Specifically, by causing the can base 12 to rotate in the circumferential direction around the can axis thereof under the inkjet heads while the UV-curable inkjet ink composition being ejected, printing is performed onto the undercoating layer formed on the outer peripheral surface of the can base 12 or the outer peripheral surface of the can base 12.

As the inkjet printer, an inkjet printer that ejects the ink composition by, for example, a charge control system or a piezo system can be used.

Next, by irradiating the ink composition laminated on the undercoating layer or the outer peripheral surface of the can base 12 with ultraviolet light, the ink composition is cured to form the ink layer 14. It is preferable that the wavelength of ultraviolet light used for curing the ink composition overlaps the absorption wavelength of the photopolymerization initiator (C) contained in the ink composition. Moreover, it is preferable that the wavelength of ultraviolet light used for forming the ink layer having less overlap with the absorption wavelength of the colorant (D) contained in the ink composition.

It is preferable to use ultraviolet light having main wavelength of 360 nm to 425 nm for the UV-curable inkjet ink composition of the exemplary embodiment. Moreover, for irradiation of ultraviolet light, an LED or a metal halide lamp that emits ultraviolet light can be used.

Subsequently, the above-described aqueous coating material is applied onto the ink layer 14. As the coating method of the coating material, for example, methods using an air spray, an airless spray, a roll coater, a curtain flow coater and the like can be provided; however, the method is not particularly limited thereto.

Thereafter, the coating material is dried and cured in accordance with the kind of coating material, to thereby form the covering layer 16. For example, when the bake-hardenable aqueous coating material is used as the coating material, the covering layer 16 is formed by baking the coating material by an oven or the like. For baking conditions when the bake-hardenable aqueous coating material is used, it is preferable to set the baking temperature to 100° C. to 250° C. and to set the baking time to 10 seconds to 30 minutes.

From the above, the can body 1, which is provided with the ink layer 14 laminated on the outer peripheral surface of the can base 12 directly or via the undercoating layer and the covering layer 16 laminated on the ink layer 14, can be obtained.

Here, in the exemplary embodiment, to form the ink layer 14, the UV-curable inkjet ink composition having the hydroxyl value in the range of not less than 1 mgKOH/g and not more than 100 mgKOH/g is used. Consequently, when the aqueous coating material is applied onto the ink layer 14 for forming the covering layer 16, sufficient wettability is obtained. As a result, as compared to a case in which the hydroxyl value of the ink composition is out of the range, a sufficient adhesive property can be obtained between the ink layer 14 and the covering layer 16, and thereby peeling of the covering layer 16 is suppressed.

EXAMPLES

Subsequently, the present invention will be described in more detail by using examples. Note that the present invention is not limited to the following examples.

(1) Preparation of Ink Composition

In each of the examples 1 to 20 and the comparative examples 1 to 5, each raw material was mixed at the blending ratio shown in the tables 1 to 4, and the obtained mixture was kneaded by a bead mill, to thereby prepare the ink composition.

TABLE 1

| | | | | Example 1 | Example 2 | Example 3 | Example 4 | Example 5 | Example 6 |
|---|---|---|---|---|---|---|---|---|---|
| Polymerizable compound | Monofunctional monomer (A) | EC-A[1] | | 30.5 | 30.5 | 30.5 | 30.5 | 40.5 | 20.5 |
| | | L-A[2] | | — | — | — | — | — | — |
| | | DPM-A[3] | | — | — | — | — | — | — |
| | | IBOA[4] | | 30.0 | 32.5 | 23.0 | 36.0 | 40.0 | 11.0 |
| | | PO-A[5] | | — | — | — | — | — | — |
| | | Hydroxyl group containing | HEA[6] | 3.0 | 0.5 | 10.0 | — | 3.0 | 3.0 |
| | | | 4-HBA[7] | — | — | — | — | — | — |
| | | | FA-2D[8] | — | — | — | — | — | — |
| | Polyfunctional monomer (B) | 4EG-A[9] | | 20.0 | 20.0 | 20.0 | 15.0 | — | 55.0 |
| | | 1,9ND-A[10] | | — | — | — | — | — | — |

TABLE 1-continued

|  |  |  | Example 1 | Example 2 | Example 3 | Example 4 | Example 5 | Example 6 |
|---|---|---|---|---|---|---|---|---|
|  |  | DPGDA[11] | — | — | — | — | — | — |
|  |  | A-DPH[12] | 3.0 | 3.0 | 3.0 | — | 3.0 | — |
|  |  | TMP-A[13] | — | — | — | — | — | — |
|  | Acrylate oligomer | EBECRYL8402[14] | — | — | — | 5.0 | — | — |
| Photopolymerization initiator (C) |  | Irgacure TPO[15] | 9.0 | 9.0 | 9.0 | 9.0 | 9.0 | 6.0 |
| Colorant (D) |  | Pigment Black 7[16] | 3.0 | 3.0 | 3.0 | 3.0 | 3.0 | 3.0 |
|  |  | Pigment Yellow 74[17] | — | — | — | — | — | — |
|  |  | Pigment Blue 15:4[18] | — | — | — | — | — | — |
|  |  | Pigment Red 122[19] | — | — | — | — | — | — |
| Dispersant |  | DISPERBYK-2155[20] | 1.5 | 1.5 | 1.5 | 1.5 | 1.5 | 1.5 |
| Total amount |  |  | 100 | 100 | 100 | 100 | 100 | 100 |
| Monofunctional monomer (A)/polyfunctional monomer (B) |  |  | 2.8 | 2.8 | 2.8 | 4.4 | 27.8 | 0.6 |
| Average number of functional groups |  |  | 1.23 | 1.23 | 1.21 | 1.13 | 1.06 | 1.49 |
| Monofunctional monomer of Tg < 20° C./monofunctional monomer (A) |  |  | 53% | 49% | 64% | 46% | 52% | 68% |
| Photopolymerization initiator (C)/colorant (D) |  |  | 3.0 | 3.0 | 3.0 | 3.0 | 3.0 | 2.0 |

TABLE 2

|  |  |  | Example 7 | Example 8 | Example 9 | Example 10 | Example 11 | Example 12 |
|---|---|---|---|---|---|---|---|---|
| Polymerizable compound | Monofunctional monomer (A) | EC-A[1] | 40.5 | 35.5 | 20.5 | 30.5 | 30.5 | 30.5 |
|  |  | L-A[2] | — | — | — | — | — | — |
|  |  | DPM-A[3] | — | — | — | — | — | — |
|  |  | IBOA[4] | 35.5 | 32.0 | 25.0 | 30.0 | 30.0 | 30.0 |
|  |  | PO-A[5] | — | — | — | — | — | — |
|  | Hydroxyl group containing | HEA[6] | 3.0 | 3.0 | 3.0 | 3.0 | 3.0 | 3.0 |
|  |  | 4-HBA[7] | — | — | — | — | — | — |
|  |  | FA-2D[8] | — | — | — | — | — | — |
|  | Polyfunctional monomer (B) | 4EG-A[9] | — | 10.0 | 10.0 | 20.0 | 20.0 | 20.0 |
|  |  | 1,9ND-A[10] | — | — | — | — | — | — |
|  |  | DPGDA[11] | — | — | — | — | — | — |
|  |  | A-DPH[12] | 15.0 | — | 28.0 | 3.0 | 3.0 | 3.0 |
|  |  | TMP-A[13] | — | — | — | — | — | — |
|  | Acrylate oligomer | EBECRYL8402[14] | — | — | — | — | — | — |
| Photopolymerization initiator (C) |  | Irgacure TPO[15] | 1.5 | 15.0 | 9.0 | 9.0 | 9.0 | 9.0 |
| Colorant (D) |  | Pigment Black 7[16] | 3.0 | 3.0 | 3.0 | — | — | — |
|  |  | Pigment Yellow 74[17] | — | — | — | 3.0 | — | — |
|  |  | Pigment Blue 15:4[18] | — | — | — | — | 3.0 | — |
|  |  | Pigment Red 122[19] | — | — | — | — | — | 3.0 |
| Dispersant |  | DISPERBYK-2155[20] | 1.5 | 1.5 | 1.5 | 1.5 | 1.5 | 1.5 |
| Total amount |  |  | 100 | 100 | 100 | 100 | 100 | 100 |
| Monofunctional monomer (A)/polyfunctional monomer (B) |  |  | 5.2 | 7.0 | 1.3 | 2.8 | 2.8 | 2.8 |
| Average number of functional groups |  |  | 1.30 | 1.08 | 1.82 | 1.23 | 1.23 | 1.23 |
| Monofunctional monomer of Tg < 20° C./monofunctional monomer (A) |  |  | 55% | 55% | 48% | 53% | 53% | 53% |
| Photopolymerization initiator (C)/colorant (D) |  |  | 0.5 | 5.0 | 3.0 | 3.0 | 3.0 | 3.0 |

TABLE 3

|  |  |  | Example 13 | Example 14 | Example 15 | Example 16 | Example 17 | Example 18 | Example 19 | Example 20 |
|---|---|---|---|---|---|---|---|---|---|---|
| Polymerizable compound | Monofunctional monomer (A) | EC-A[1] | — | — | 30.5 | 30.5 | 30.5 | 30.5 | 30.5 | 30.5 |
|  |  | L-A[2] | 30.5 | — | — | — | — | — | — | — |
|  |  | DPM-A[3] | — | 30.5 | — | — | — | — | — | — |
|  |  | IBOA[4] | 30.0 | 30.0 | — | 30.0 | 30.0 | 30.0 | 30.0 | 30.0 |
|  |  | PO-A[5] | — | — | 30.0 | — | — | — | — | — |
|  | Hydroxyl group containing | HEA[6] | 3.0 | 3.0 | 3.0 | — | — | 3.0 | 3.0 | 3.0 |
|  |  | 4-HBA[7] | — | — | — | 3.0 | — | — | — | — |
|  |  | FA-2D[8] | — | — | — | — | 3.0 | — | — | — |
|  | Polyfunctional monomer (B) | 4EG-A[9] | 20.0 | 20.0 | 20.0 | 20.0 | 20.0 | — | — | 20.0 |
|  |  | 1,9ND-A[10] | — | — | — | — | — | 20.0 | — | — |
|  |  | DPGDA[11] | — | — | — | — | — | — | 20.0 | — |
|  |  | A-DPH[12] | 3.0 | 3.0 | 3.0 | 3.0 | 3.0 | 3.0 | 3.0 | — |

TABLE 3-continued

|  |  | Example 13 | Example 14 | Example 15 | Example 16 | Example 17 | Example 18 | Example 19 | Example 20 |
|---|---|---|---|---|---|---|---|---|---|
|  | TMP-A[13] | — | — | — | — | — | — | — | 3.0 |
| Acrylate oligomer | EBECRYL8402[14] | — | — | — | — | — | — | — | — |
| Photopolymerization Initiator (C) | Irgacure TPO[15] | 9.0 | 9.0 | 9.0 | 9.0 | 9.0 | 9.0 | 9.0 | 9.0 |
| Colorant (D) | Pigment Black 7[16] | 3.0 | 3.0 | 3.0 | 3.0 | 3.0 | 3.0 | 3.0 | 3.0 |
|  | Pigment Yellow 74[17] | — | — | — | — | — | — | — | — |
|  | Pigment Blue 15:4[18] | — | — | — | — | — | — | — | — |
|  | Pigment Red 122[19] | — | — | — | — | — | — | — | — |
| Dispersant | DISPERBYK-2155[20] | 1.5 | 1.5 | 1.5 | 1.5 | 1.5 | 1.5 | 1.5 | 1.5 |
| Total amount |  | 100 | 100 | 100 | 100 | 100 | 100 | 100 | 100 |
| Monofunctional monomer (A)/polyfunctional monomer (B) |  | 2.8 | 2.8 | 2.8 | 2.8 | 2.8 | 2.8 | 2.8 | 2.8 |
| Average number of functional groups |  | 1.25 | 1.23 | 1.22 | 1.23 | 1.24 | 1.24 | 1.26 | 1.21 |
| Monofunctional monomer of Tg < 20° C./monofunctional monomer (A) |  | 53% | 51% | 100% | 53% | 53% | 53% | 53% | 53% |
| Photopolymerization initiator (C)/colorant (D) |  | 3.0 | 3.0 | 3.0 | 3.0 | 3.0 | 3.0 | 3.0 | 3.0 |

TABLE 4

|  |  |  | Comparative example 1 | Comparative example 2 | Comparative example 3 | Comparative example 4 | Comparative example 5 |
|---|---|---|---|---|---|---|---|
| Polymerizable compound | Monofunctional monomer (A) | EC-A[1] | 30.5 | 20.5 | 30.5 | 30.5 | 30.5 |
|  |  | L-A[2] | — | — | — | — | — |
|  |  | DPM-A[3] | — | — | — | — | — |
|  |  | IBOA[4] | 33.0 | 18.0 | 33.0 | 33.0 | 33.0 |
|  |  | PO-A[5] | — | — | — | — | — |
|  | Hydroxyl group containing | HEA[6] | — | 25.0 | — | — | — |
|  |  | 4-HBA[7] | — | — | — | — | — |
|  |  | FA-2D[8] | — | — | — | — | — |
|  | Polyfunctional monomer (B) | 4EG-A[9] | 20.0 | 20.0 | 20.0 | 20.0 | 20.0 |
|  |  | 1,9ND-A[10] | — | — | — | — | — |
|  |  | DPGDA[11] | — | — | — | — | — |
|  |  | A-DPH[12] | 3.0 | 3.0 | 3.0 | 3.0 | 3.0 |
|  |  | TMP-A[13] | — | — | — | — | — |
| Acrylate oligomer | EBECRYL8402[14] |  | — | — | — | — | — |
| Photopolymerization initiator (C) | Irgacure TPO[15] |  | 9.0 | 9.0 | 9.0 | 9.0 | 9.0 |
| Colorant (D) | Pigment Black 7[16] |  | 3.0 | 3.0 | — | — | — |
|  | Pigment Yellow 74[17] |  | — | — | 3.0 | — | — |
|  | Pigment Blue 15:4[18] |  | — | — | — | 3.0 | — |
|  | Pigment Red 122[19] |  | — | — | — | — | 3.0 |
| Dispersant | DISPERBYK-2155[20] |  | 1.5 | 1.5 | 1.5 | 1.5 | 1.5 |
| Total amount |  |  | 100 | 100 | 100 | 100 | 100 |
| Monofunctional monomer (A)/polyfunctional monomer (B) |  |  | 2.8 | 2.8 | 2.8 | 2.8 | 2.8 |
| Average number of functional groups |  |  | 1.23 | 1.19 | 1.23 | 1.23 | 1.23 |
| Monofunctional monomer of Tg < 20° C./monofunctional monomer (A) |  |  | 48% | 72% | 48% | 48% | 48% |
| Photopolymerization initiator (C)/colorant (D) |  |  | 3.0 | 3.0 | 3.0 | 3.0 | 3.0 |

[1] Ethoxyethoxyethyl acrylate (Kyoeisha Chemical Co., Ltd.)
[2] Lauryl acrylate (Kyoeisha Chemical Co., Ltd.)
[3] Dipropylene glycol monomethyl acrylate (Kyoeisha Chemical Co., Ltd.)
[4] Isobornyl acrylate (NIPPON SHOKUBAI CO., LTD.)
[5] Phenoxyethyl acrylate (Kyoeisha Chemical Co., Ltd.)
[6] 2-hydroxyethyl acrylate (Osaka Organic Chemical Industry Ltd.)
[7] 4-hydroxybutyl acrylate (Osaka Organic Chemical Industry Ltd.)
[8] Unsaturated fatty acid hydroxy alkyl ester modified ε-caprolactone (Daicel Corporation)
[9] Tetraethylene glycol diacrylate (Kyoeisha Chemical Co., Ltd.)
[10] 1,9-nonanediol diacrylate (Kyoeisha Chemical Co., Ltd.)
[11] Dipropylene glycol diacrylate (DAICEL-ALLNEX LTD.)
[12] Dipentaerythritol hexaacrylate (Shin Nakamura Chemical Co., Ltd.)
[13] Trimethylol propane triacrylate (Kyoeisha Chemical Co., Ltd.)
[14] Urethane oligomer (DAICEL-ALLNEX LTD.)
[15] Photopolymerization initiator (BASF Japan Ltd.)
[16] Raven 450 (Columbian Carbon Japan)
[17] Sico Yellow FR1252HD (BASF SE)
[18] Heliogen Blue L7080 (BASF SE)
[19] SicoFast Red 3855 (BASF SE)
[20] Pigment dispersant (BYK Japan KK)

(2) Hydroxyl Value

Regarding the ink composition in each of the examples 1 to 20 and the comparative examples 1 to 5, the hydroxyl value was calculated by calculation using the blended composition of the above-described hydroxyl-containing compound.

(3) Formation of Ink Layer 14 and Covering Layer 16

On an outer peripheral surface of a cylindrical aluminum can having a diameter of 66 mm, an ink composition in each of the example 1 to the example 20 and the comparative examples 1 to 5 was printed in the coating amount of 5.6 g/m² by an inkjet printer. Subsequently, by irradiating the ink composition laminated on the outer peripheral surface of the aluminum can with ultraviolet light by use of an LED (main wavelength of 385 nm), the ink composition was cured to form the ink layer 14.

Next, on the ink layer 14, an aqueous melamine coating material was applied by use of a roll coater to form a film of 59 mg/dm² after being dried, and thereafter, the coating material was cured by drying by heating to form the covering layer 16.

(4) Evaluation Test

<Coatability Evaluation>

An outer appearance of the ink layer 14 when the aqueous melamine coating material was applied onto the ink layer 14 to form the covering layer 16 was observed, and thereby coatability of the coating material on the ink layer 14 was evaluated. Note that the evaluation was performed based on the following criteria.

A: When the coating material is applied, bleeding or burrs are not observed on the ink layer 14.

B: When the coating material is applied, bleeding is observed on the ink layer 14.

C: When the coating material is applied, the ink layer 14 is peeled off and the base of the aluminum can is observed.

<Pencil Hardness Evaluation>

For the aluminum can on which the ink layer 14 and the covering layer 16 were formed, a scratch hardness test prescribed in JIS K 5600-5-4 was conducted, to thereby evaluate the pencil hardness. Note that the evaluation was performed based on the following criteria.

A: The pencil hardness is H or more.
B: The pencil hardness is F.
C: The pencil hardness is HB or less.

<Adhesive Property Evaluation>

For the aluminum can on which the ink layer 14 and the covering layer 16 were formed, a test by the cross-cut method prescribed in JIS K 5600-5-6 was conducted, to thereby evaluate the adhesive property. Note that the evaluation was performed based on the following criteria.

A: Corresponding to Category 0 in JIS K 5600-5-6.
B: Corresponding to Categories 1 and 2 in JIS K 5600-5-6.
C: Corresponding to Categories 3 and 4 in JIS K 5600-5-6.
D: Corresponding to Category 5 in JIS K 5600-5-6.

<Retort Resistance Evaluation>

The water vapor at 125° C. was applied to the aluminum can on which the ink layer 14 and the covering layer 16 were formed for 30 minutes, and thereafter, the aluminum can was returned to the room temperature. Thereafter, the test by the cross-cut method prescribed in JIS K 5600-5-6 was conducted, to thereby evaluate the retort resistance (heat resistance and water resistance). Note that the evaluation was performed based on the following criteria.

A: Corresponding to Category 0 in JIS K 5600-5-6.
B: Corresponding to Categories 1 and 2 in JIS K 5600-5-6.
C: Corresponding to Categories 3 and 4 in JIS K 5600-5-6.
D: Corresponding to Category 5 in JIS K 5600-5-6.

(5) Evaluation Result

In the tables 5 to 8, properties of the ink composition and the result of each evaluation test in each of the examples 1 to 20 and the comparative examples 1 to 5 are shown.

TABLE 5

|  |  | Example 1 | Example 2 | Example 3 | Example 4 | Example 5 | Example 6 |
|---|---|---|---|---|---|---|---|
| Hydroxyl value of ink composition [mgKOH/g] | | 14 | 2 | 60 | 3 | 14 | 14 |
| Evaluation test | Coatability evaluation | A | A | A | A | A | A |
| | Pencil hardness evaluation | A | A | A | A | B | A |
| | Adhesive property evaluation | A | C | A | A | A | A |
| | Retort resistance evaluation | A | C | B | C | A | C |

TABLE 6

|  |  | Example 7 | Example 8 | Example 9 | Example 10 | Example 11 | Example 12 |
|---|---|---|---|---|---|---|---|
| Hydroxyl value of ink composition [mgKOH/g] | | 14 | 14 | 14 | 14 | 14 | 14 |
| Evaluation test | Coatability evaluation | B | A | A | A | A | A |
| | Pencil hardness evaluation | A | B | A | A | A | A |
| | Adhesive property evaluation | A | C | B | A | A | A |
| | Retort resistance evaluation | A | C | B | A | A | A |

TABLE 7

|  |  | Example 13 | Example 14 | Example 15 | Example 16 | Example 17 | Example 18 | Example 19 | Example 20 |
|---|---|---|---|---|---|---|---|---|---|
| Hydroxyl value of ink composition [mgKOH/g] |  | 14 | 14 | 14 | 12 | 6 | 14 | 14 | 14 |
| Evaluation test | Coatability evaluation | A | A | A | A | A | A | A | A |
|  | Pencil hardness evaluation | A | A | A | A | A | A | A | A |
|  | Adhesive property evaluation | A | A | A | A | A | A | A | A |
|  | Retort resistance evaluation | A | A | A | A | A | A | A | A |

TABLE 8

|  |  | Comparative example 1 | Comparative example 2 | Comparative example 3 | Comparative example 4 | Comparative example 5 |
|---|---|---|---|---|---|---|
| Hydroxyl value of ink composition [mgKOH/g] |  | <1 | 121 | <1 | <1 | <1 |
| Evaluation test | Coatability evaluation | A | A | A | A | A |
|  | Pencil hardness evaluation | A | A | A | A | A |
|  | Adhesive property evaluation | D | A | D | D | D |
|  | Retort resistance evaluation | D | D | D | D | D |

As shown in the tables 5 to 8, in the examples 1 to 20 using the ink composition containing the monofunctional monomer (A), the polyfunctional monomer (B), the photopolymerization initiator (C) and the colorant (D) and having the hydroxyl value in the range of not less than 1 mgKOH/g and not more than 100 mgKOH/g, it was confirmed that excellent results were obtained in the evaluation tests of the coatability, the pencil hardness, the adhesive property and the retort resistance. In other words, in the examples 1 to 20, it was confirmed that the curing property of the ink layer 14 and the adhesive property of the ink layer 14 to the outer peripheral surface of the aluminum can were excellent.

In contrast thereto, in the comparative examples 1, 3 to 5 using the ink composition having the hydroxyl value of less than 1 mgKOH/g, it was confirmed that the ink composition was inferior in the adhesive property and the retort resistance.

Moreover, in the comparative example 2 using the ink composition having the hydroxyl value exceeding 100 mgKOH/g, it was confirmed that the ink composition had the excellent adhesive property, but was inferior in the retort resistance.

Note that the present invention can be grasped as a can body.

In other words, a can body to which the present invention is applied includes: a can base made of a cylindrical metal material; an ink layer that is provided on a curved outer peripheral surface of the can base, and is formed by ejecting a UV-curable inkjet ink composition by an inkjet head, the UV-curable inkjet ink composition containing a monofunctional monomer (A), a polyfunctional monomer (B), a photopolymerization initiator (C) and a colorant (D), with a hydroxyl value in a range of not less than 1 mgKOH/g and not more than 100 mgKOH/g, and being cured by irradiation with ultraviolet light; and a covering layer that is made of an aqueous coating material and is laminated on the ink layer to cover the ink layer.

Moreover, the present invention can also be grasped as a method of manufacturing a can body.

In other words, a method of manufacturing a can body to which the present invention is applied includes: forming an ink layer by ejecting a UV-curable inkjet ink composition onto a curved outer peripheral surface of a can base made of a cylindrical metal material by an inkjet head, the UV-curable inkjet ink composition containing a monofunctional monomer (A), a polyfunctional monomer (B), a photopolymerization initiator (C) and a colorant (D), with a hydroxyl value in a range of not less than 1 mgKOH/g and not more than 100 mgKOH/g, and curing the UV-curable inkjet ink composition by irradiation with ultraviolet light; and forming a covering layer that covers the ink layer by applying an aqueous coating material onto the ink layer.

Here, the method can be characterized in that the covering layer is formed by applying a bake-hardenable aqueous coating material as the aqueous coating material.

Moreover, the method can be characterized in that the covering layer is formed by applying an amino-resin-based aqueous coating material as the aqueous coating material.

REFERENCE SIGNS LIST

1 Can body
10 Container portion
20 Lid member
12 Can base
14 Ink layer
16 Covering layer

The invention claimed is:

1. A UV-curable inkjet ink composition that contains a monofunctional monomer (A), a polyfunctional monomer (B), a photopolymerization initiator (C) and a colorant (D) and is cured by irradiation with ultraviolet light, wherein
   a hydroxyl value of the UV-curable inkjet ink composition is in a range of not less than 1 mgKOH/g and not more than 100 mgKOH/g, and
   the UV-curable inkjet ink composition forms, by inkjet printing, an ink layer provided between a curved outer peripheral surface of a can base made of a cylindrical metallic material and a covering layer made of an aqueous coating material.

2. The UV-curable inkjet ink composition according to claim 1, wherein at least one of the monofunctional monomer (A) and the polyfunctional monomer (B) includes a hydroxyl-containing monomer.

3. The UV-curable inkjet ink composition according to claim 1, wherein a blending amount ratio of the photopolymerization initiator (C) and the colorant (D) satisfies 0.5≤(photopolymerization initiator/colorant)≤5.0.

4. The UV-curable inkjet ink composition according to claim 1, wherein the photopolymerization initiator (C) contains an acylphosphine-oxide-based photopolymerization initiator.

5. The UV-curable inkjet ink composition according to claim 1, wherein a blending amount ratio of the monofunctional monomer (A) and the polyfunctional monomer (B) satisfies 2≤(monofunctional monomer (A)/polyfunctional monomer (B))≤20.

6. The UV-curable inkjet ink composition according to claim 1, wherein an average number of functional groups of a polymerizable compound containing the monofunctional monomer (A) and the polyfunctional monomer (B) is in a range of not less than 1.0 and not more than 1.4.

7. The UV-curable inkjet ink composition according to claim 1, wherein the monofunctional monomer (A) contains a monofunctional monomer having a glass transition temperature of less than 20° C., and a content rate of the monofunctional monomer having the glass transition temperature of less than 20° C. in the monofunctional monomer (A) is in a range of not less than 50% by mass and not more than 100% by mass.

8. A can, comprising:
a can base made of a cylindrical metallic material,
an ink layer disposed on a surface of the can base, the ink layer obtained by printing the UV-curable inkjet composition according to claim 1, and
a covering layer made of an aqueous coating material disposed on the ink layer.

9. The can according to claim 8, wherein at least one of the monofunctional monomer (A) and the polyfunctional monomer (B) includes a hydroxyl-containing monomer.

10. The can according to claim 8, wherein a blending amount ratio of the photopolymerization initiator (C) and the colorant (D) satisfies 0.5≤(photopolymerization initiator/colorant)≤5.0.

11. The can according to claim 8, wherein the photopolymerization initiator (C) contains an acylphosphine-oxide-based photopolymerization initiator.

12. The can according to claim 8, wherein a blending amount ratio of the monofunctional monomer (A) and the polyfunctional monomer (B) satisfies 2≤(monofunctional monomer (A)/polyfunctional monomer (B))≤20.

13. The can according to claim 8, wherein an average number of functional groups of a polymerizable compound containing the monofunctional monomer (A) and the polyfunctional monomer (B) is in a range of not less than 1.0 and not more than 1.4.

14. The can according to claim 8, wherein the monofunctional monomer (A) contains a monofunctional monomer having a glass transition temperature of less than 20° C., and a content rate of the monofunctional monomer having the glass transition temperature of less than 20° C. in the monofunctional monomer (A) is in a range of not less than 50% by mass and not more than 100% by mass.

* * * * *